(12) United States Patent
Kim

(10) Patent No.: US 11,470,190 B2
(45) Date of Patent: Oct. 11, 2022

(54) ELECTRONIC DEVICE HAVING GRIP SENSOR AND METHOD OF CONTROLLING THE ELECTRONIC DEVICE HAVING GRIP SENSOR

(71) Applicant: Samsung Electronics Co., Ltd., Suwon-si (KR)

(72) Inventor: Seonil Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 132 days.

(21) Appl. No.: 16/999,369

(22) Filed: Aug. 21, 2020

(65) Prior Publication Data

US 2021/0105350 A1  Apr. 8, 2021

(30) Foreign Application Priority Data

Oct. 2, 2019  (KR) ........................ 10-2019-0122327

(51) Int. Cl.
*H04M 1/00* (2006.01)
*H04M 1/02* (2006.01)
*G06F 3/044* (2006.01)
*G06F 3/01* (2006.01)

(52) U.S. Cl.
CPC ........... *H04M 1/0214* (2013.01); *G06F 3/011* (2013.01); *G06F 3/044* (2013.01); *G06F 2203/04102* (2013.01); *H04M 2250/22* (2013.01)

(58) Field of Classification Search
CPC . H04M 1/0214; H04M 2250/22; G06F 3/011; G06F 3/044; G06F 2203/04102

USPC ....................................................... 455/575.3
See application file for complete search history.

(56) References Cited

U.S. PATENT DOCUMENTS

| | | | | |
|---|---|---|---|---|
| 6,968,056 B2 * | 11/2005 | Barnett | ............... | H04M 1/0216 |
| | | | | 455/575.3 |
| 7,612,766 B2 * | 11/2009 | Shintome | ............ | H04M 1/0245 |
| | | | | 455/90.3 |
| 8,224,406 B2 * | 7/2012 | Champion | ............ | G06F 1/1615 |
| | | | | 361/679.16 |

(Continued)

FOREIGN PATENT DOCUMENTS

| JP | 2004-179995 A | 6/2004 |
|---|---|---|
| KR | 10-2007-0082308 A | 8/2007 |

(Continued)

OTHER PUBLICATIONS

International Search Report dated Nov. 25, 2020, issued in International Application No. PCT/KR2020/011146.

*Primary Examiner* — April G Gonzales
(74) *Attorney, Agent, or Firm* — Jefferson IP Law, LLP

(57) ABSTRACT

A foldable electronic device is provided. The foldable electronic device includes a first housing, a second housing rotatably coupled to the first housing, at least one antenna disposed in at least one of the first housing or the second housing, a first grip sensor disposed in the first housing, a second grip sensor disposed in the second housing, and at least one processor. The at least one processor is configured to obtain a first detection value through the first grip sensor, obtain a second detection value through the second grip sensor, and decrease the strength of a signal output from the at least one antenna based on the first detection value and the second detection value.

11 Claims, 15 Drawing Sheets

(56) References Cited

U.S. PATENT DOCUMENTS

| | | | |
|---|---|---|---|
| 8,248,789 B2* | 8/2012 | Wu | H04M 1/0216 |
| | | | 345/169 |
| 8,264,823 B2* | 9/2012 | Kim | H04M 1/0216 |
| | | | 361/679.01 |
| 9,867,139 B1* | 1/2018 | Khasgiwala | H04B 17/318 |
| 2002/0016191 A1* | 2/2002 | Ijas | G06F 1/1616 |
| | | | 455/566 |
| 2004/0209641 A1* | 10/2004 | Hong | H04M 1/0247 |
| | | | 455/575.3 |
| 2005/0164752 A1* | 7/2005 | Lau | H04M 1/0247 |
| | | | 455/575.1 |
| 2010/0041439 A1* | 2/2010 | Bullister | G06F 1/165 |
| | | | 455/566 |
| 2012/0206556 A1* | 8/2012 | Yu | H04W 52/288 |
| | | | 348/14.02 |
| 2015/0062927 A1* | 3/2015 | Hirakata | H05K 5/0017 |
| | | | 362/362 |
| 2015/0281414 A1* | 10/2015 | Michino | G06F 1/1681 |
| | | | 455/575.3 |
| 2017/0206049 A1* | 7/2017 | Choi | G06F 1/1652 |

FOREIGN PATENT DOCUMENTS

| | | |
|---|---|---|
| KR | 10-2008-0014550 A | 2/2008 |
| KR | 10-2016-0117385 A | 10/2016 |

* cited by examiner

ELECTRONIC DEVICE HAVING GRIP SENSOR AND METHOD OF CONTROLLING THE ELECTRONIC DEVICE HAVING GRIP SENSOR

CROSS-REFERENCE TO RELATED APPLICATION(S)

This application is based on and claims priority under 35 U.S.C. § 119(a) of a Korean patent application number 10-2019-0122327, filed on Oct. 2, 2019, in the Korean Intellectual Property Office, the disclosure of which is incorporated by reference herein in its entirety.

BACKGROUND

1. Field

The disclosure relates to an electronic device having a grip sensor and a method of controlling the electronic device having a grip sensor. More particularly, the disclosure relates to an electronic device for reducing the strength of a signal output from an antenna based on a detection value from a grip sensor, and a control method of reducing the strength of a signal output from an antenna based on a detection value from a grip sensor in the electronic device.

2. Description of Related Art

Electronic devices communicating with other electronic devices have been widely used. To communicate with another electronic device, an electronic device may radiate electromagnetic waves through an antenna. Although it may not be said for sure whether electromagnetic waves radiated from electronic devices are harmful to the human body, several institutions limit exposure to electromagnetic waves by a standard according to a precautionary principle, in terms of specific absorption rate (SAR) which is a rate at which electromagnetic wave signals emitted from an electronic device are absorbed into biological tissues.

An electronic device with a grip sensor may identify whether a user has touched the electronic device based on a detection value obtained from the grip sensor. When the user has touched the electronic device, the electronic device may reduce the strength of an output signal to maintain a SAR value equal to or less than a value specified in the standard.

An existing electronic device is provided with a single grip sensor and configured to reduce the strength of a signal output from an antenna based on a detection value from the grip sensor. When one grip sensor is used in a foldable electronic device in which two housings are rotatably coupled to each other, a user's contact with a housing including the grip sensor may be detected, whereas the user's contact with the other housing without the grip sensor may not be detected. Accordingly, when the user touches the housing without the grip sensor, the electronic device fails in appropriately reducing the strength of a signal output from the antenna.

Moreover, the use of the single grip sensor in the existing electronic device makes it impossible to identify a part of the electronic device touched by the user. Therefore, even though the strength of the output signal of the antenna needs to be decreased by a different decrement depending on a touched part, the existing electronic device decreases the strength of an output signal by the same decrement, which has been calculated with respect to a part of the electronic device requiring a maximum decrement for the strength of an output signal, irrespective of which part of the electronic device is touched by the user. As a consequence, the existing electronic device reduces the total radiated power (TRP) of the antenna by more than needed.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device with a grip sensor and a method of controlling the electronic device with a grip sensor. According to the electronic device and the method of controlling the electronic device, the electronic device may include a plurality of grip sensors. According to various embodiments of the disclosure, the electronic device may decrease the strength of a signal output from an antenna by a different decrement based on detection values from the plurality of grip sensors.

Additional aspects will be set forth in part in the description which follows and, in part, will be apparent from the description, or may be learned by practice of the presented embodiments.

In accordance with an aspect of the disclosure, a foldable electronic device is provided. The foldable electronic device includes a first housing, a second housing rotatably coupled to the first housing, at least one antenna disposed in at least one of the first housing or the second housing, a first grip sensor disposed in the first housing, a second grip sensor disposed in the second housing, and at least one processor. The at least one processor is configured to obtain a first detection value through the first grip sensor, obtain a second detection value through the second grip sensor, and decrease the strength of a signal output from the at least one antenna based on the first detection value and the second detection value.

In accordance with another aspect of the disclosure, a method performed in a foldable electronic device is provided. The method includes obtaining a first detection value through a first grip sensor disposed in a first housing of the foldable electronic device, obtaining a second detection value through a second grip sensor disposed in a second housing rotatably coupled to the first housing, and decreasing the strength of a signal output from at least one antenna disposed in the first housing or the second housing based on the first detection value and the second detection value.

In accordance with another aspect of the disclosure, a storage medium readable by a non-transitory computer stores instructions. When executed by at least one processor, the instructions cause at least one processor to obtain a first detection value through a first grip sensor disposed in a first housing of the foldable electronic device, obtain a second detection value through a second grip sensor disposed in a second housing rotatably coupled to the first housing, and decrease the strength of a signal output from at least one antenna disposed in the first housing or the second housing based on the first detection value and the second detection value.

In accordance with another aspect of the disclosure, a foldable electronic device is provided. The foldable electronic device includes a first housing, a second housing rotatably coupled to the first housing, a connector rotatable between the first housing and the second housing, at least one antenna disposed in the first housing or the second housing, a grip sensor disposed at the connector, and at least one processor. The at least one processor is configured to obtain a detection value from the grip sensor, and decrease the strength of a signal output from the at least one antenna based on the detection value.

In accordance with another aspect of the disclosure, a method performed in a foldable electronic device is provided. The method includes a first housing and a second housing rotatably coupled to the first housing includes obtaining a detection value from a grip sensor disposed at a connector rotatable between the first housing and the second housing, and decreasing the strength of a signal output from at least one antenna disposed in the first housing or the second housing based on the detection value.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
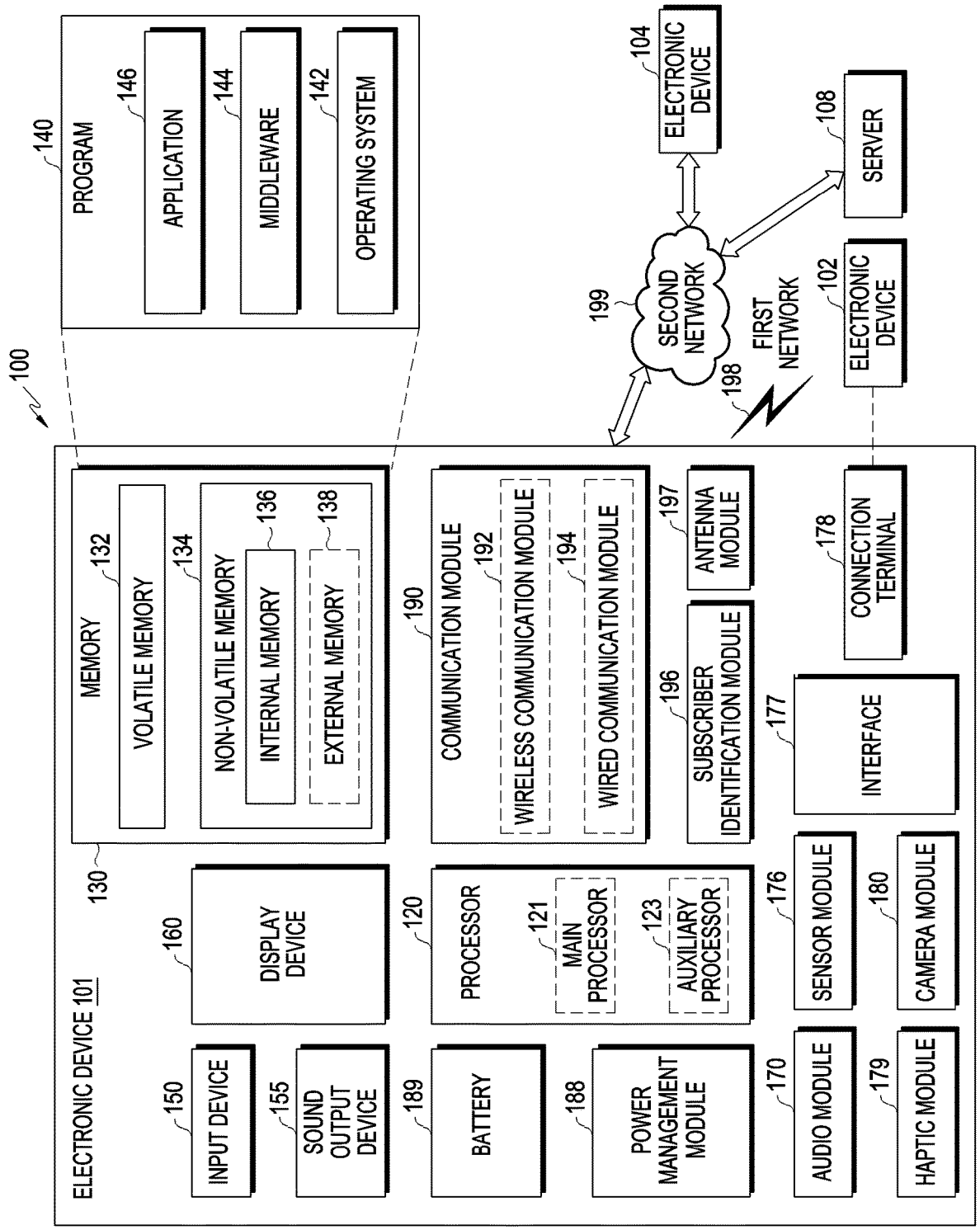
FIG. 1 is a block diagram illustrating an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2A:
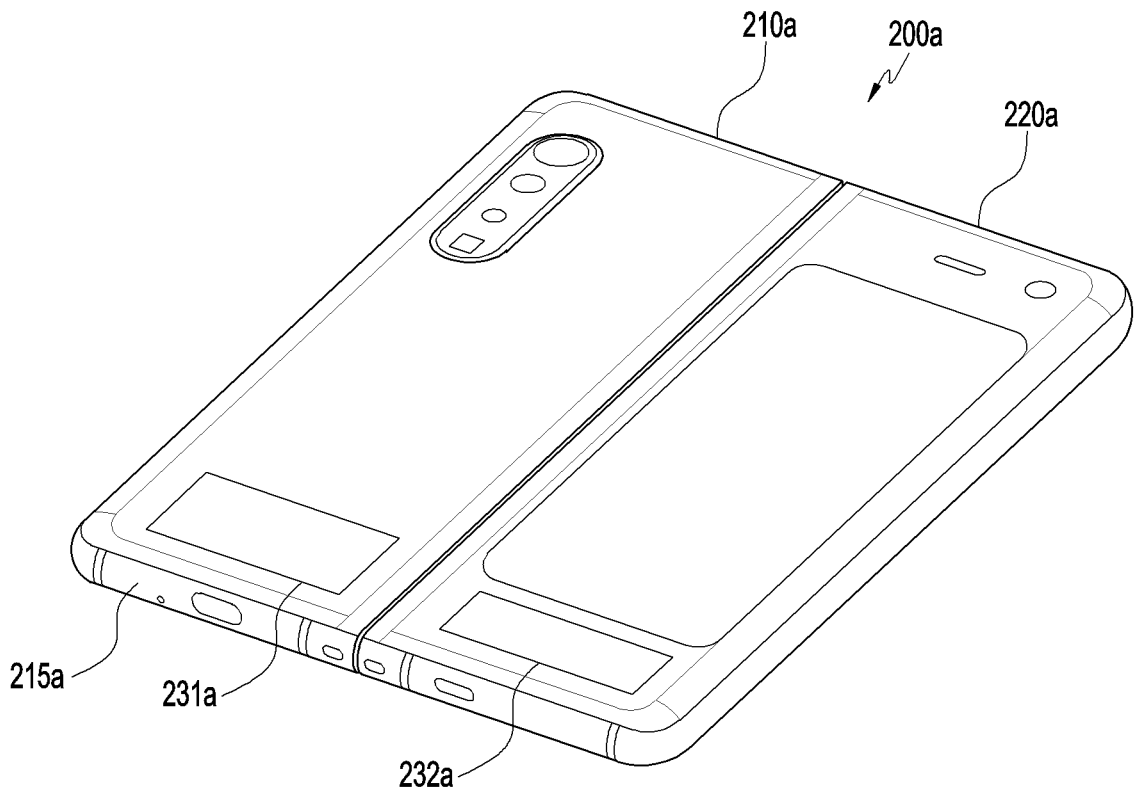
FIGS. 2A and 2B are diagrams illustrating an exterior of a foldable electronic device according to various embodiments of the disclosure.
Figure 2B:
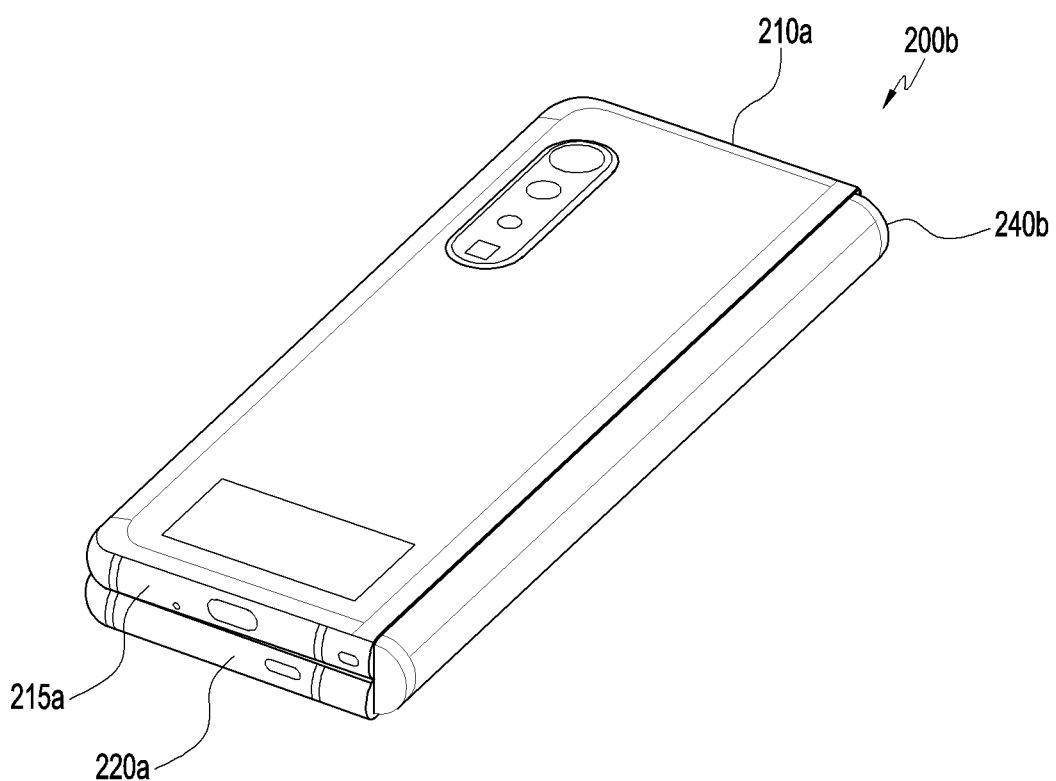

FIGS. 2A and 2B illustrate an exterior of a foldable electronic device according to various embodiments of the disclosure.

Specifically, FIG. 2A illustrates the exterior of a foldable electronic device 200*a* including two housings, when the housings are unfolded.

Referring to FIG. 2A, according to various embodiments of the disclosure, the foldable electronic device 200*a* may include a first housing 210*a* and a second housing 220*a*. According to various embodiments of the disclosure, the first housing 210*a* may include at least one side surface formed of a metal, which may be used at least partially as an antenna 215*a*. The antenna 215*a* is shown as disposed in the first housing 210*a* in FIG. 2A. According to various embodiments of the disclosure, the antenna 215*a* may be disposed on at least one side surface of the second housing 220*a*, instead of a side surface of the first housing 210*a*. According to various embodiments of the disclosure, alternatively, the antenna 215*a* may be disposed on at least one side surface of the first housing 210*a* and at least one side surface of the second housing 220*a*.

According to various embodiments of the disclosure, the foldable electronic device 200*a* may include a first grip sensor 231*a* disposed in the first housing 210*a* and a second grip sensor 232*a* disposed in the second housing 220*a*. The illustration of the first grip sensor 231*a* and the second grip sensor 232*a* in FIG. 2A is intended for the sole purpose of demonstrating the positions of the first grip sensor 231*a* and the second grip sensor 232*a* in the first housing 210*a* and the second housing 220*a*, not implying that the positions of the first grip sensor 231*a* and the second grip sensor 232*a* are confined to surfaces of the first housing 210*a* and the second housing 220*a*.

FIG. 2B illustrates an exterior of a foldable electronic device 200*b* including two housings, when the two housings are folded.

Referring to FIG. 2B, the foldable electronic device 200*b* may include the first housing 210*a* and the second housing 220*a*. According to various embodiments of the disclosure, the antenna 215*a* may be disposed on one side surface of the first housing 210*a*. For details of the antenna 215*a*, refer to FIG. 2A. To avoid redundancy, the details of the antenna 215*a* will not be described herein. According to various embodiments of the disclosure, the first housing 210*a* and the second housing 220*a* may be rotatably coupled to each other by means of a connector 240*b*. According to various embodiments of the disclosure, the connector 240*b* may include a hinge.

Figure 2C:
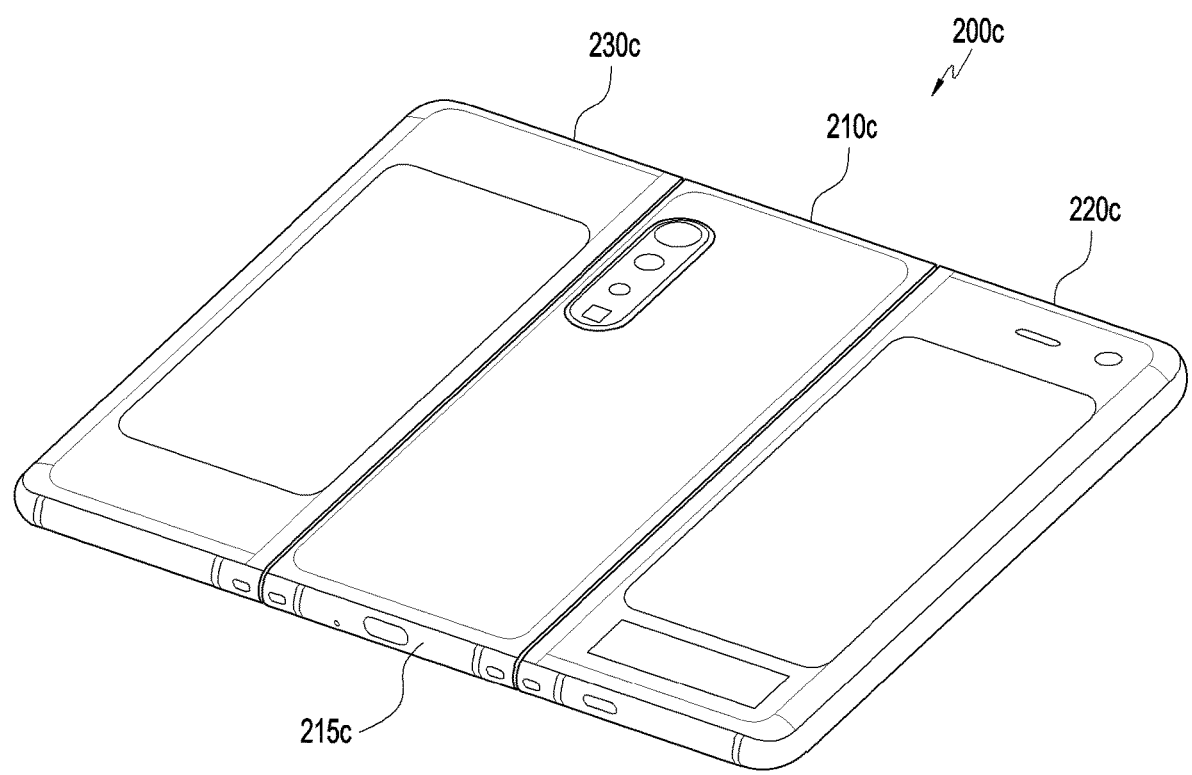
FIGS. 2C and 2D are diagrams illustrating an exterior of a foldable electronic device according to various embodiments of the disclosure.
Figure 2D:
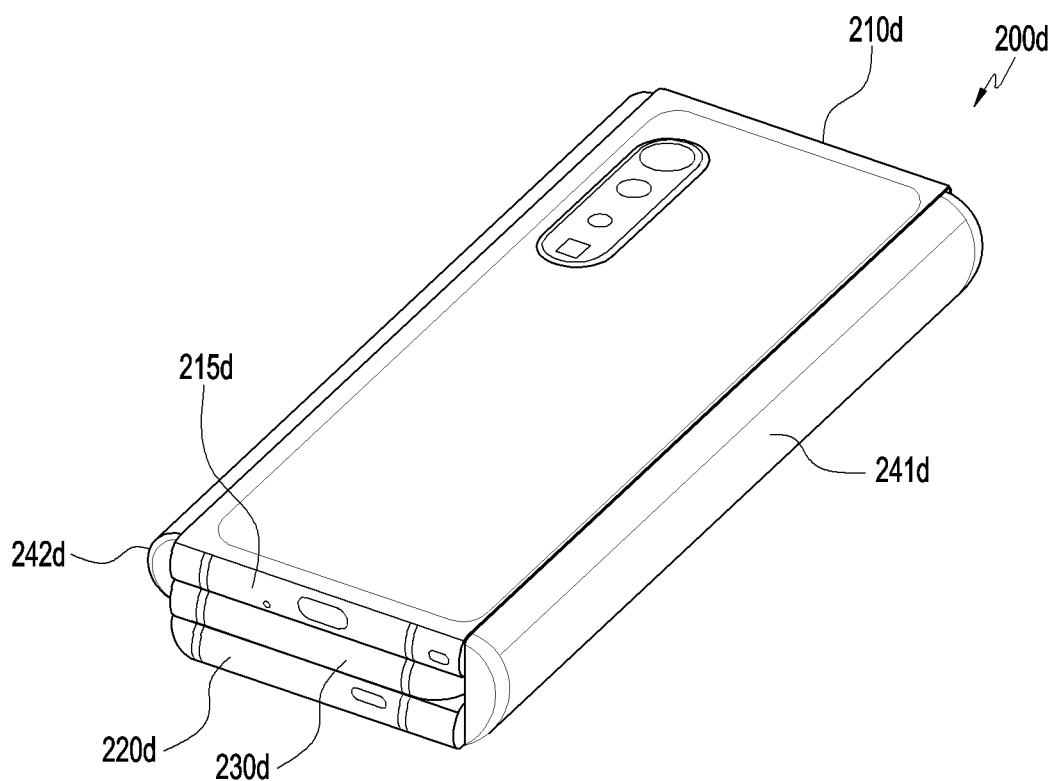

FIGS. 2C and 2D illustrate an exterior of a foldable electronic device according to various embodiments of the disclosure.

Specifically, FIG. 2C illustrates the exterior of a foldable electronic device 200*c* including three housings, when the three housings are fully unfolded without overlap.

Referring to FIG. 2C, according to various embodiments of the disclosure, the foldable electronic device 200*c* may include a first housing 210*c*, a second housing 220*c*, and a third housing 230*c*. According to various embodiments of the disclosure, the first housing 210*c* may include at least one side surface formed of a metal, which may be used at least partially as an antenna 215*c*. The antenna 215*c* is shown in FIG. 2C as disposed in the first housing 210*c*. According to various embodiments of the disclosure, the antenna 215*c* may be disposed in the second housing 220*c* or the third housing 230*c*. According to various embodiments of the disclosure, alternatively, the antenna 215*c* may be disposed across side surfaces of at least two of the first housing 210*c*, the second housing 220*c*, or the third housing 230*c*.

FIG. 2D illustrates an exterior of a foldable electronic device 200d including three housings, when the three housings are folded.

Referring to FIG. 2D, a first housing 210d and a second housing 220d may be rotatably coupled to each other by means of a first connector 241d, and the first housing 210d and a third housing 230d may be rotatably coupled to each other by means of a second connector 242d, in the foldable electronic device 200d. According to various embodiments of the disclosure, the first connector 241d and/or the second connector 242d may include a hinge. According to various embodiments of the disclosure, when the first housing 210d, the second housing 220d, and the third housing 230d are folded, the third housing 230d may be interposed between the first housing 210d and the second housing 220d. According to various embodiments of the disclosure, an antenna 215d may be disposed on one side surface of the first housing 210d. For details of the antenna 215d, refer to FIG. 2C. To avoid redundancy, the details of the antenna 215d will not be described herein.

Figure 2E:
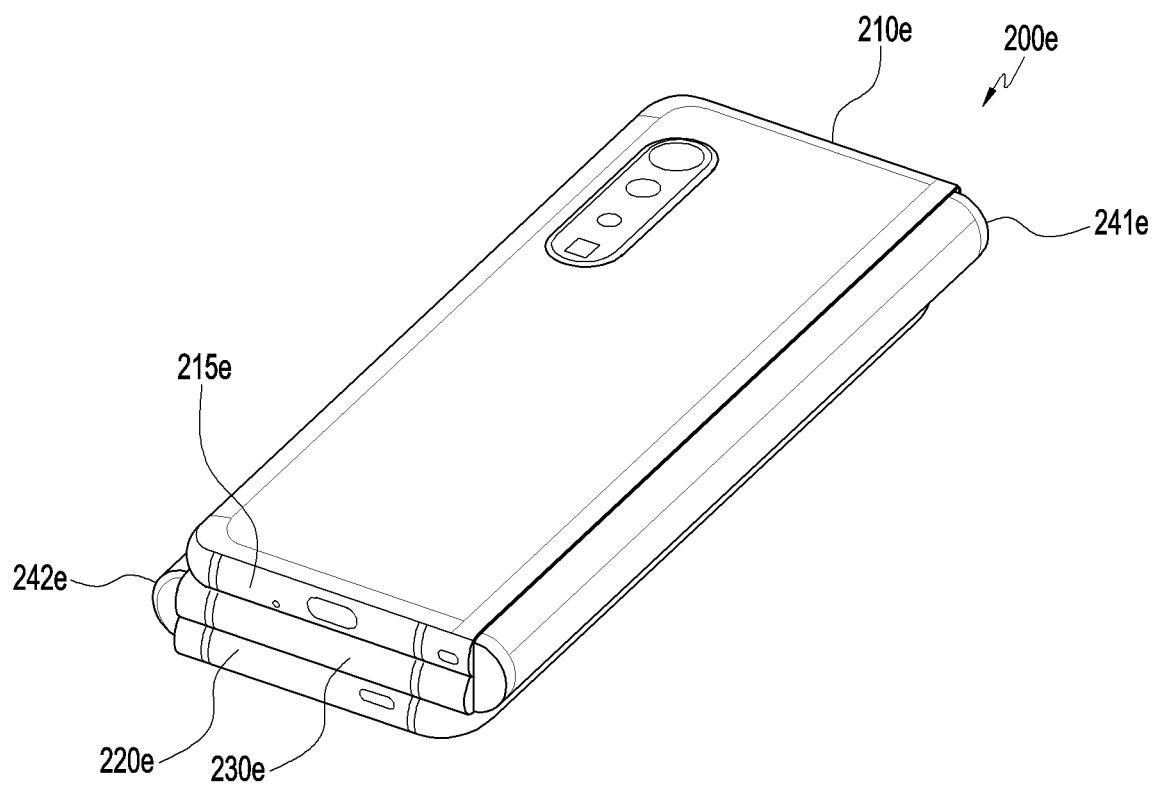
FIG. 2E is a diagram illustrating an exterior of a foldable electronic device according to an embodiment of the disclosure.

FIG. 2E illustrates an exterior of a foldable electronic device according to an embodiment of the disclosure.

Specifically, FIG. 2E illustrates the exterior of a foldable electronic device 200e including three housings, which is folded in a different manner from the foldable electronic device 200d illustrated in FIG. 2D.

Referring to FIG. 2E, according to various embodiments of the disclosure, a first housing 210e and a third housing 230e may be rotatably coupled to each other by means of a first connector 241e, and the first housing 210e and a second housing 220e may be rotatably coupled to each other by means of a second connector 242e, in the foldable electronic device 200e. According to various embodiments of the disclosure, the first connector 241e and/or the second connector 242e may include a hinge. According to various embodiments of the disclosure, when the first housing 210e, the second housing 220e, and the third housing 230e are folded, the third housing 230e may be interposed between the first housing 210e and the second housing 220e, in the foldable electronic device 200e. According to various embodiments of the disclosure, an antenna 215e may be disposed on one side surface of the first housing 210e. For details of the antenna 215e, refer to FIG. 2C. To avoid redundancy, the details of the antenna 215d will not be described herein.

Figure 2F:
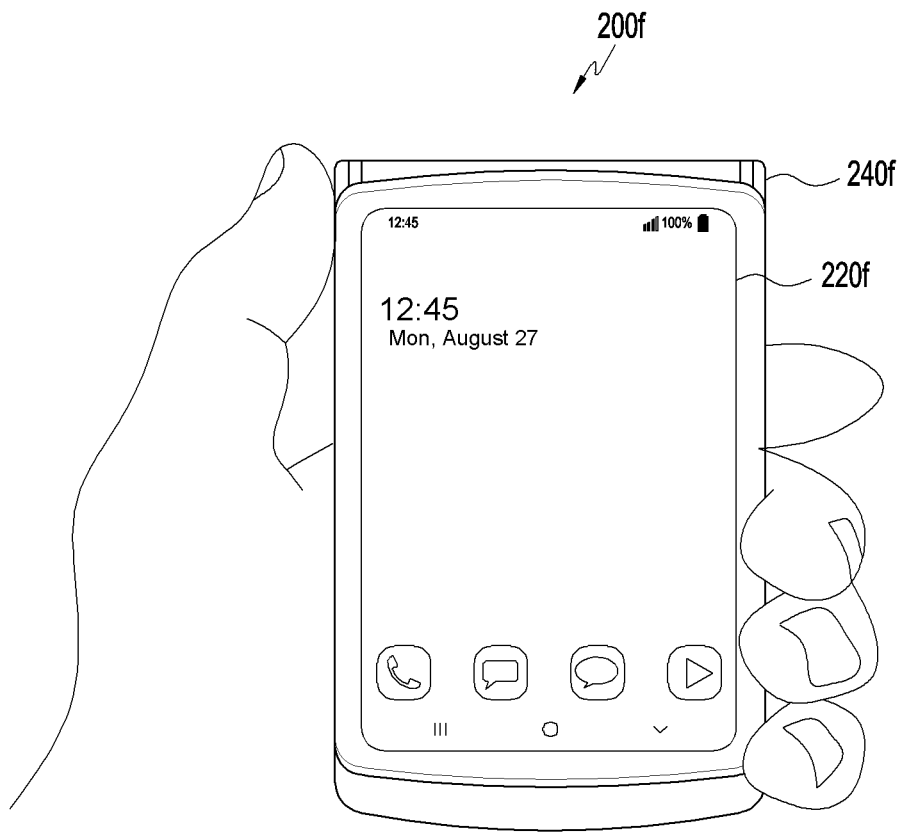
FIGS. 2F and 2G are diagrams illustrating an exterior of a foldable electronic device according to various embodiments of the disclosure.
Figure 2G:
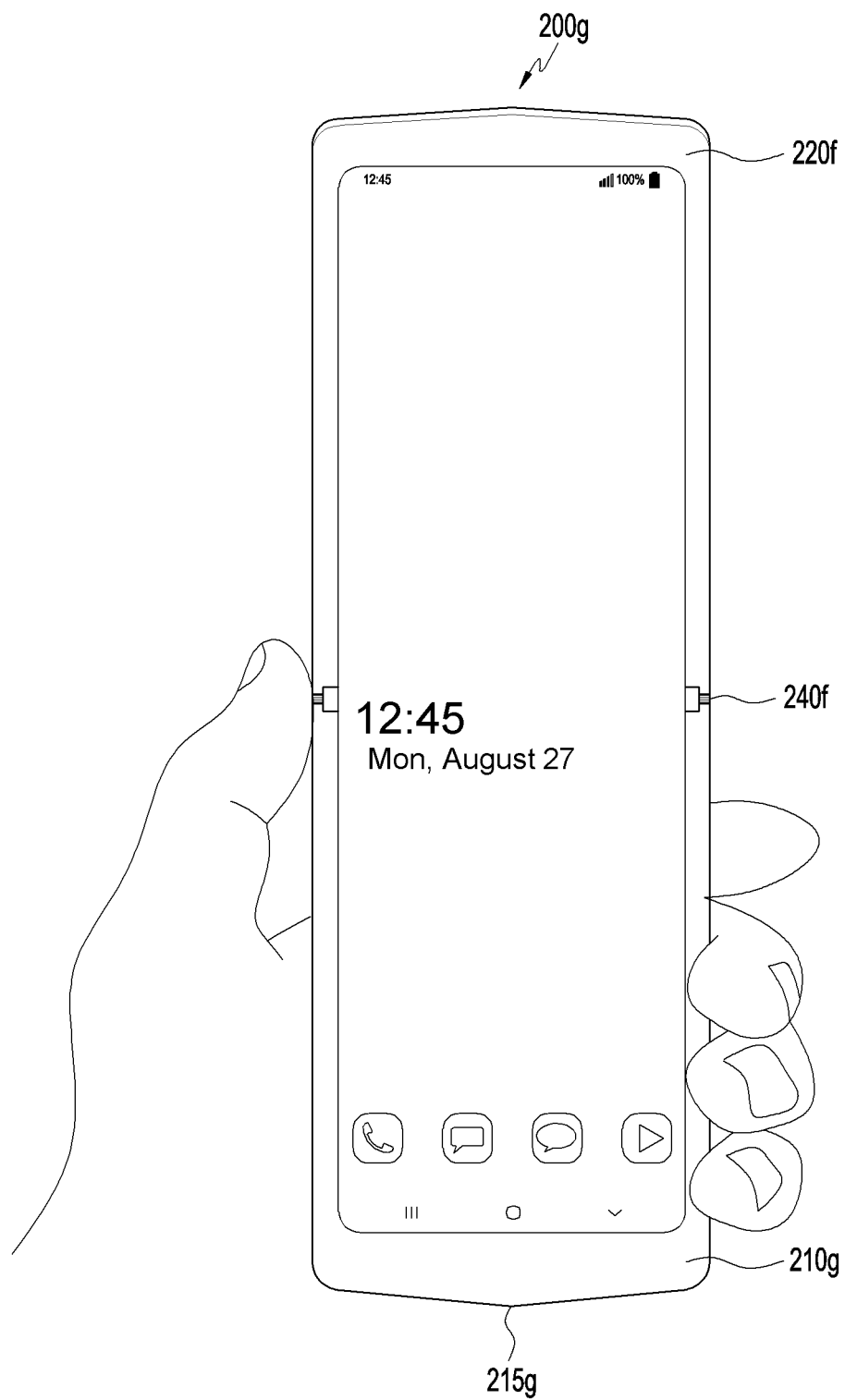

FIGS. 2F and 2G illustrate an exterior of a foldable electronic device according to various embodiments of the disclosure.

Specifically, FIG. 2F illustrates the exterior of a foldable electronic device 200f including two housings, when the two housings are folded. FIG. 2G illustrates the exterior of a foldable electronic device 200g including two housings, when the two housings are unfolded. Each of the foldable electronic devices 200f and 220g may include a first housing 210g and a second housing 220f. According to various embodiments of the disclosure, an antenna 215g may be disposed on one side surface of the first housing 210g. For details of the antenna 215g, refer to FIG. 2A. To avoid redundancy, the details of the antenna 215g will not be described herein. According to various embodiments of the disclosure, the first housing 210g and the second housing 220f may be rotatably coupled to each other by a connector 240f. According to various embodiments of the disclosure, the connector 240f may include a hinge.

Figure 3:
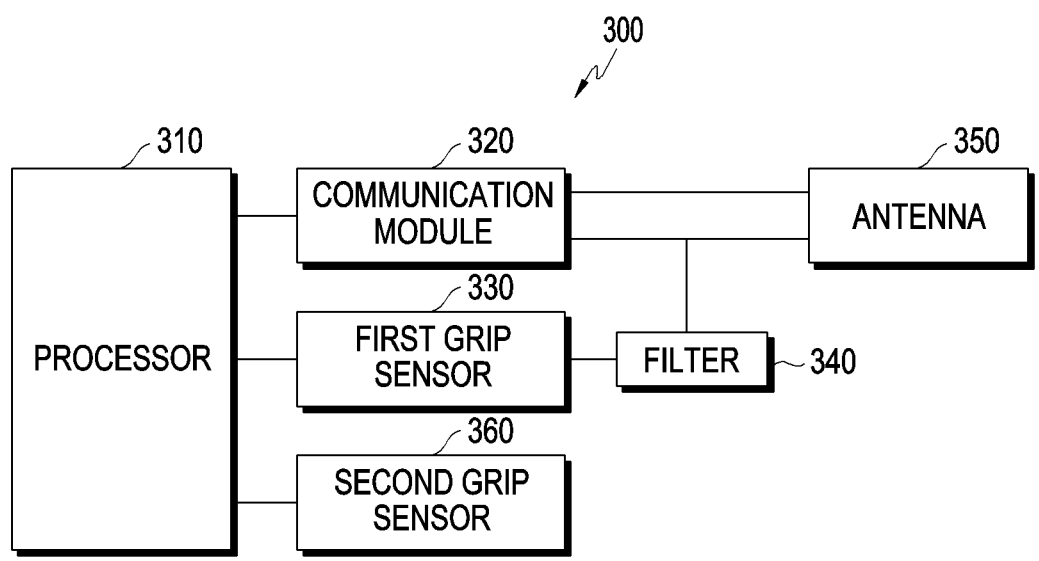
FIG. 3 is a block diagram illustrating an electronic device according to an embodiment of the disclosure.

FIG. 3 is a block diagram illustrating an electronic device according to an embodiment of the disclosure.

Referring to FIG. 3, an electronic device 300 (e.g., the electronic device 101) may include a processor 310 (e.g., the processor 120), a communication module 320 (e.g., the communication module 190), a first grip sensor 330, a second grip sensor 360, an antenna 350 (e.g., the antenna module 197), and a filter 340. According to various embodiments of the disclosure, the first grip sensor 330 may be disposed in a first housing of the electronic device 300, and the second grip sensor 360 may be disposed in a second housing of the electronic device 300.

According to various embodiments of the disclosure, the antenna 350 may include at least one of a mobile communication antenna, a sub-communication antenna, a near field communication (NFC) antenna, a broadcasting communication antenna, a global positioning system (GPS) antenna, or an antenna for wireless charging. According to various embodiments of the disclosure, the antenna 350 may have both ends electrically coupled to the communication module 320. According to various embodiments of the disclosure, one end of the antenna 350 may be coupled to the filter 340. According to various embodiments of the disclosure, the filter 340 may couple between the antenna 350 and the first grip sensor 330. According to various embodiments of the disclosure, the filter 340 may transmit, to the first grip sensor 330, only a signal in a second frequency (e.g., hundreds of kHz) lower than a resonant frequency of the antenna 350 in a total frequency band of the antenna 350. Current in the second frequency (e.g., hundreds of kHz) is almost direct current (DC), not affecting communication. Therefore, the antenna 350 may serve as both a radiator for communication and a conductor for detection of the first grip sensor 330.

The antenna 350 has been described as a part of the outer surface of the first housing having the first grip sensor 330 disposed therein in the example of FIG. 3. However, compared to FIG. 3, the antenna 350 may be a part of the outer surface of the second housing or parts of the outer surfaces of the first and second housings in the electronic device 300 in various embodiments. The relationship between the first grip sensor 330 and the antenna 350 described with reference to FIG. 3 is identical to the relationship between the second grip sensor 360 and the antenna 350 in the example of the antenna 350 being a part of the outer surface of the second housing in the electronic device 300, which will not be described herein to avoid redundancy.

According to various embodiments of the disclosure, the antenna 350 may be disposed inside the second housing or inside both of the first and second housings in the electronic device 300.

According to various embodiments of the disclosure, when an external object contacts or approaches the antenna 350, the first grip sensor 330 may detect a capacitance variation and provide a detection signal to the processor 310.

According to various embodiments of the disclosure, the second grip sensor 360 may include a part of the outer surface of the second housing, which is a conductor. When an external object contacts or approaches the conductor, the second grip sensor 360 may detect a capacitance variation and provide a detection signal to the processor 310.

According to various embodiments of the disclosure, the processor 310 may identify a detection value of the first grip sensor 330 based on the detection signal received from the first grip sensor 330, and a detection value of the second grip sensor 360 based on the detection signal received from the second grip sensor 360. According to various embodiments of the disclosure, the processor 310 may identify whether the user has touched the first housing and/or the second housing according to whether the detection value of the first grip sensor 330 and/or the detection value of the second grip sensor 360 is equal to or greater than a predetermined threshold. According to various embodiments of the disclosure, the processor 310 may control the communication module 320 to control the strength of a signal output from the antenna 350 based on whether the user has touched the first housing and whether the user has touched the second housing.

Figure 4A:
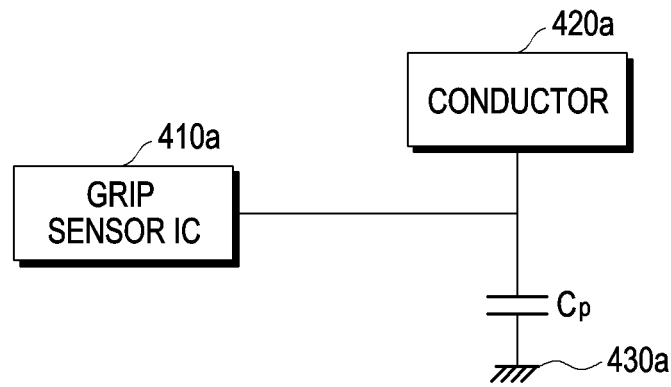
FIGS. 4A and 4B are diagrams illustrating a principle of a grip sensor according to various embodiments of the disclosure.
Figure 4B:
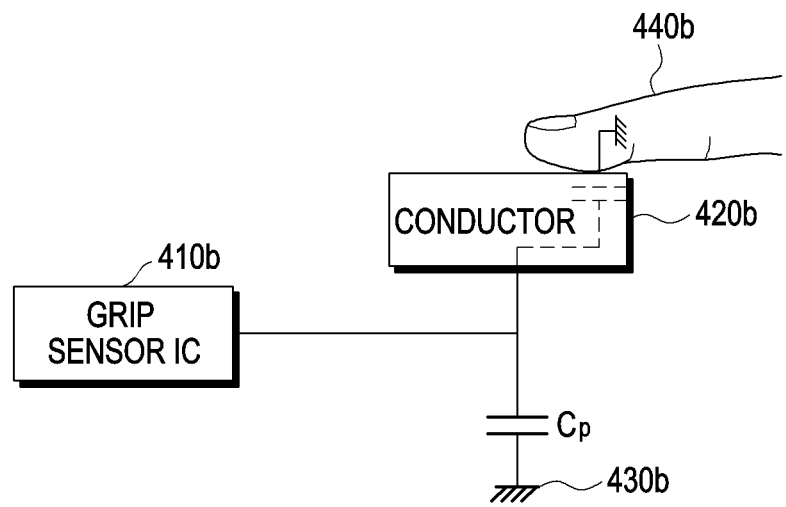

FIGS. 4A and 4B are diagrams illustrating an principle of a grip sensor according to various embodiments of the disclosure.

Specifically, FIG. 4A is a block diagram for the case where a user is not touching a conductor, and FIG. 4B is a block diagram for the case where the user is touching the conductor.

Referring to FIG. 4A, the grip sensor may include a grip sensor integrated circuit (IC) 410a and a conductor 420a. According to various embodiments of the disclosure, the grip sensor IC 410a may be coupled to the conductor 420a and a PCB ground 430a. In FIG. 4A, capacitance between the grip sensor IC 410a and the PCB ground 430a is denoted by $C_p$. In FIG. 4A, capacitance detected by the grip sensor IC 410a is $C_p$.

Similarly to FIG. 4A, referring to FIG. 4B, the grip sensor may include a grip sensor IC 410b and a conductor 420b, and the grip sensor IC 410b may be coupled to the conductor 420a and a PCB ground 430b.

Referring to FIG. 4B, capacitance between the grip sensor IC 410b and the PCB ground 430b is denoted by $C_p$. In FIG. 4B, a user 440b is touching the conductor 420b. Herein, the user 440b acts as a ground. Therefore, capacitance detected by the grip sensor IC 410b is a value obtained by adding $C_p$ to capacitance $C_f$ between the grip sensor IC 410b and the user 440b. According to various embodiments of the disclosure, the grip sensor IC 410b may generate a detection value based on a capacitance variation caused by the touch of the user 440b.

Figure 5:
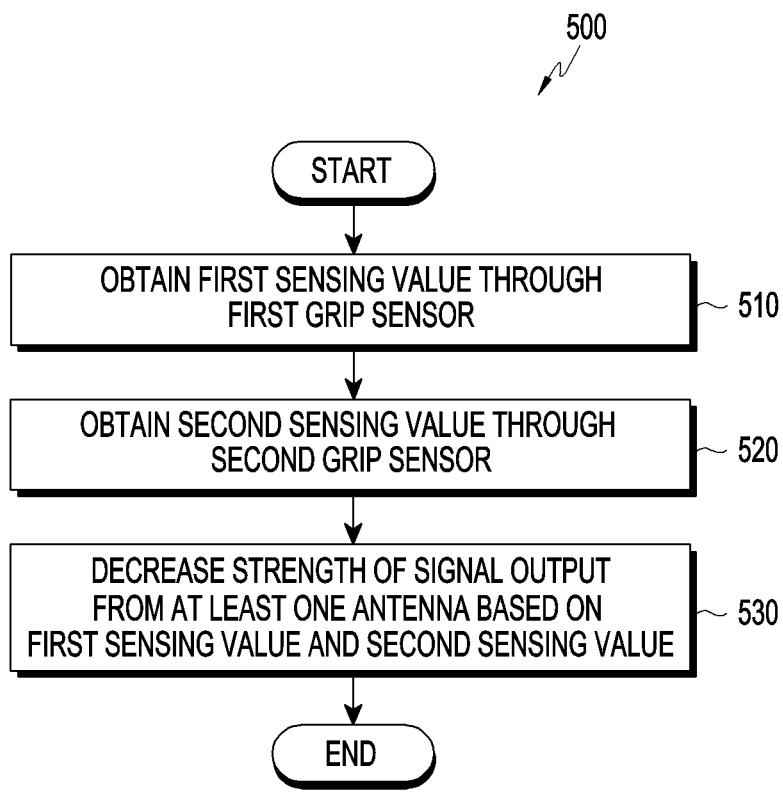
FIG. 5 is a flowchart illustrating an operation of an electronic device according to an embodiment of the disclosure.

FIG. 5 is a flowchart 500 illustrating an operation of an electronic device according to an embodiment of the disclosure.

Referring to FIG. 5, in operation 510, a processor (e.g., the processor 120) of an electronic device (e.g., the electronic device 101) may obtain a first detection value through a first grip sensor. According to various embodiments of the disclosure, the first grip sensor may be the grip sensor described before with reference to FIGS. 4A and 4B.

In operation 520, the processor (e.g., the processor 120) of the electronic device (e.g., the electronic device 101) may obtain a second detection value through a second grip sensor. According to various embodiments of the disclosure, the electronic device 101 may include a first housing and a second housing rotatably coupled to the first housing. The first grip sensor may be disposed in the first housing, and the second grip sensor may be disposed in the second housing. According to various embodiments of the disclosure, the second grip sensor may be the grip sensor described before with reference to FIGS. 4A and 4B.

In operation 530, the processor (e.g., the processor 120) of the electronic device (e.g., the electronic device 101) may decrease the strength of a signal output from at least one antenna (e.g., the antenna module 197) based on the first detection value and the second detection value. According to various embodiments of the disclosure, the processor 120 may identify whether each of the first detection value and the second detection value is equal to or greater than a predetermined threshold, and decrease the strength of a signal output from the at least one antenna in full consideration of whether the first detection value is equal to or greater than the predetermined threshold and whether the second detection value is equal to or greater than the predetermined threshold. According to various embodiments of the disclosure, the electronic device 101 may be configured to maintain the strength of the output signal unchanged based on the first detection value and the second detection value. For example, when identifying that there is no need for decreasing the strength of the output signal based on the first detection value and the second detection value, the electronic device 101 may maintain the strength of the signal output from the antenna. Further, the electronic device 101 may increase the strength of the output signal based on the first detection value and the second detection value. For example, when the electronic device 101 has decreased the strength of the signal by a back-off value and identifies that either the first detection value or the second detection value does not require back-off, the electronic device 101 may increase the strength of the signal output from the antenna. The electronic device 101 may adjust the strength of the signal output from the antenna by adjusting the intensity of current input to the antenna.

According to various embodiments of the disclosure, when both of the first detection value and the second detection value are less than the predetermined threshold, the processor 120 may not decrease the strength of the signal output from the at least one antenna. According to various embodiments of the disclosure, when the first detection value is equal to or greater than the predetermined threshold, and the second detection value is less than the predetermined threshold, the processor 120 may decrease the strength of the signal output from the at least one antenna by a first value. According to various embodiments of the disclosure, when the first detection value is less than the predetermined threshold, and the second detection value is equal to or greater than the predetermined threshold, the processor 120 may decrease the strength of the signal output from the at least one antenna by a second value. According to various embodiments of the disclosure, when both of the first detection value and the second detection value are equal to or greater than the predetermined threshold, the processor 120 may decrease the strength of the signal output from the at least one antenna by a third value.

According to various embodiments of the disclosure, the first value, the second value, and the third value may be empirically determined to be values satisfying a required SAR reference value. According to various embodiments of the disclosure, the electronic device (e.g., the electronic device 101) may be brought into contact with a flat phantom, and then a SAR value may be measured within the flat phantom. In this case, with the first housing of the electronic device 101 in contact with the flat phantom, the first value may be determined to be a value that makes a detected SAR value equal to or less than the reference value. Similarly, with the second housing of the electronic device 101 in contact with the flat phantom, the second value may be determined to be a value that makes a detected SAR value equal to or less than the reference value. Similarly, in the state where bottom ends of the first housing and the second housing of the electronic device 101 are in contact with the flat phantom, that is, in the state where a side surface including the antenna 215a in one of the first and second housings and a corresponding side surface of the other housing without the antenna 215a are in contact with the flat phantom, the third value may be determined to be a value that makes a detected SAR value equal to or less than the reference value.

According to various embodiments of the disclosure, when the first detection value is less than the predetermined threshold and the second detection value is equal to or greater than the predetermined threshold, it may be understood that the user has touched the second housing, not the first housing. Similarly, when the first detection value is equal to or greater than the predetermined threshold and the second detection value is less than the predetermined threshold, it may be understood that the user has touched the first housing, not the second housing. Therefore, according to various embodiments of the disclosure, when at least one antenna is disposed in the first housing, not in the second housing, the first value may be set to be greater than the second value. Alternatively, according to various embodiments of the disclosure, when at least one antenna is disposed in the second housing, not in the first housing, the first value may be set to be less than the second value.

According to various embodiments of the disclosure, when both of the first detection value and the second detection value are equal to or greater than the predetermined threshold, it may be understood that the user has touched both the first housing and the second housing. Therefore, the third value may be set to be greater than the first and second values.

According to various embodiments of the disclosure, the first value, the second value, and the third value may vary according to a frequency band. According to various embodiments of the disclosure, a description of relative magnitudes of at least two of the first value, the second value, or the third value may be understood as a description of relative magnitudes of at least two of the first value, the second value, or the third value in the same frequency band.

Figure 6:
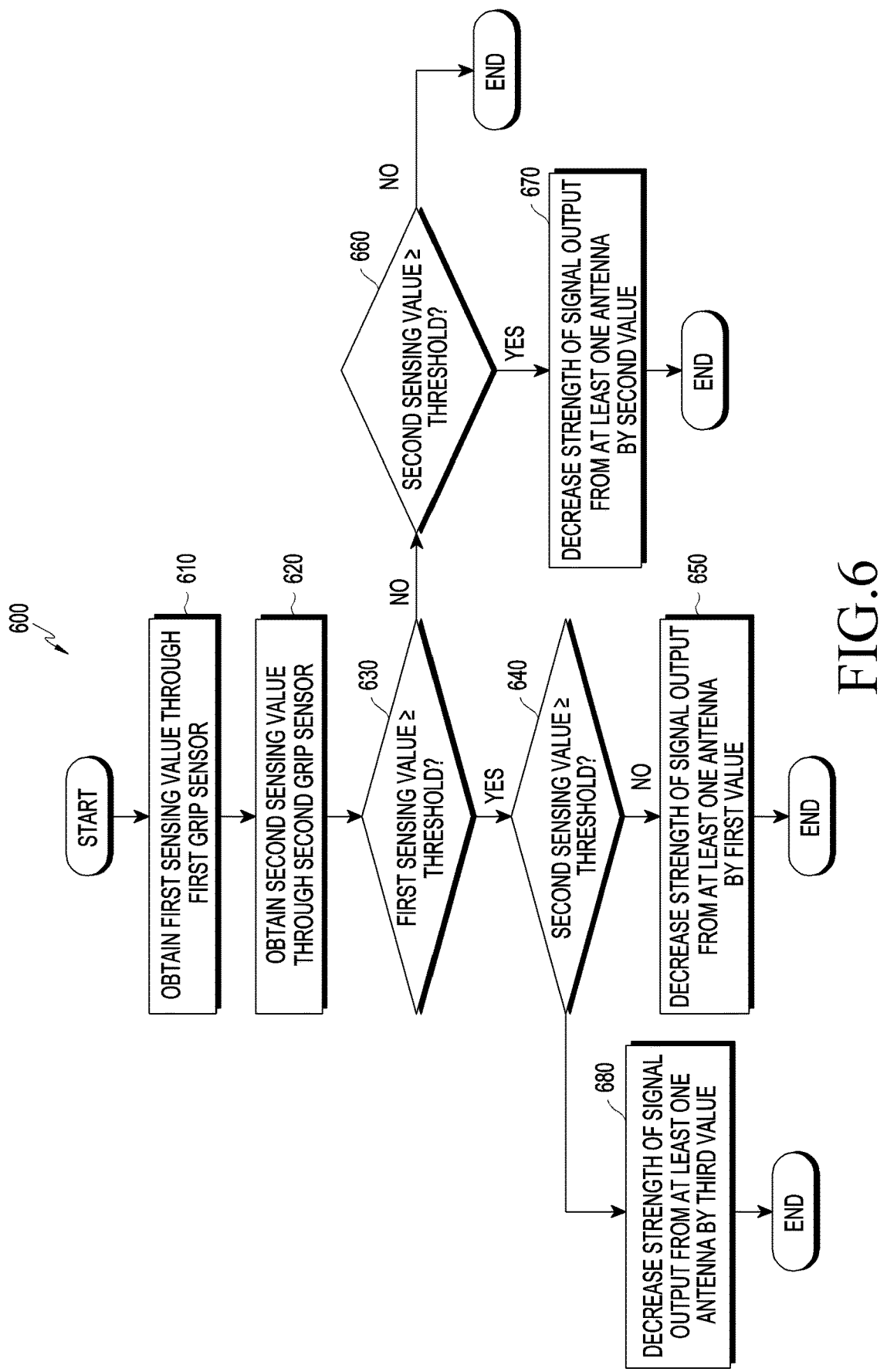
FIG. 6 is a flowchart illustrating an operation of an electronic device according to an embodiment of the disclosure.

FIG. 6 is a flowchart 600 illustrating an operation of an electronic device according to an embodiment of the disclosure.

Referring to FIG. 6, in operation 610, a processor (e.g., the processor 120) of an electronic device (e.g., the electronic device 101) may obtain a first detection value through a first grip sensor. According to various embodiments of the disclosure, the first grip sensor may be the grip sensor described before with reference to FIGS. 4A and 4B.

In operation 620, the processor (e.g., the processor 120) of the electronic device (e.g., the electronic device 101) may obtain a second detection value through a second grip sensor. According to various embodiments of the disclosure, the electronic device 101 may include a first housing and a second housing rotatably coupled to the first housing. The first grip sensor may be disposed in the first housing, and the second grip sensor may be disposed in the second housing. According to various embodiments of the disclosure, the second grip sensor may be the grip sensor described before with reference to FIGS. 4A and 4B.

In operation 630, the processor (e.g., the processor 120) of the electronic device (e.g., the electronic device 101) may identify whether the first detection value is equal to or greater than a threshold. When the processor 120 identifies that the first detection value is equal to or greater than the threshold in operation 630, the processor 120 may identify whether the second detection value is equal to or greater than the threshold in operation 640. When the processor 120 identifies that the second detection value is less than the threshold in operation 640, the processor 120 may decrease the strength of a signal output from at least one antenna (e.g., the antenna module 197) by a first value in operation 650.

When the processor 120 identifies that the second detection value is equal to or greater than the threshold in operation 640, the processor 120 may decrease the strength of the signal output from the at least one antenna (e.g., the antenna module 197) by a third value in operation 680.

When the processor 120 identifies that the first detection value is less than the threshold in operation 630, the processor 120 may identify whether the second detection value is equal to or greater than the threshold in operation 660. When the processor 120 identifies that the second detection value is less than the threshold in operation 660, the processor 120 may end the method. In this case, the processor 120 of the electronic device 101 does not change the strength of the signal output from the at least one antenna (e.g., the antenna module 197).

When the processor 120 identifies that the second detection value is equal to or greater than the threshold in operation 660, the processor 120 may decrease the strength of the signal output from the at least one antenna (e.g., the antenna module 197) by a second value in operation 670.

A method of setting the first value, the second value, and the third value and a comparison of the magnitudes of the first value, the second value, and the third value have been described before with reference to FIG. 5, and thus will not be described again herein, to avoid redundancy.

Figure 7A:
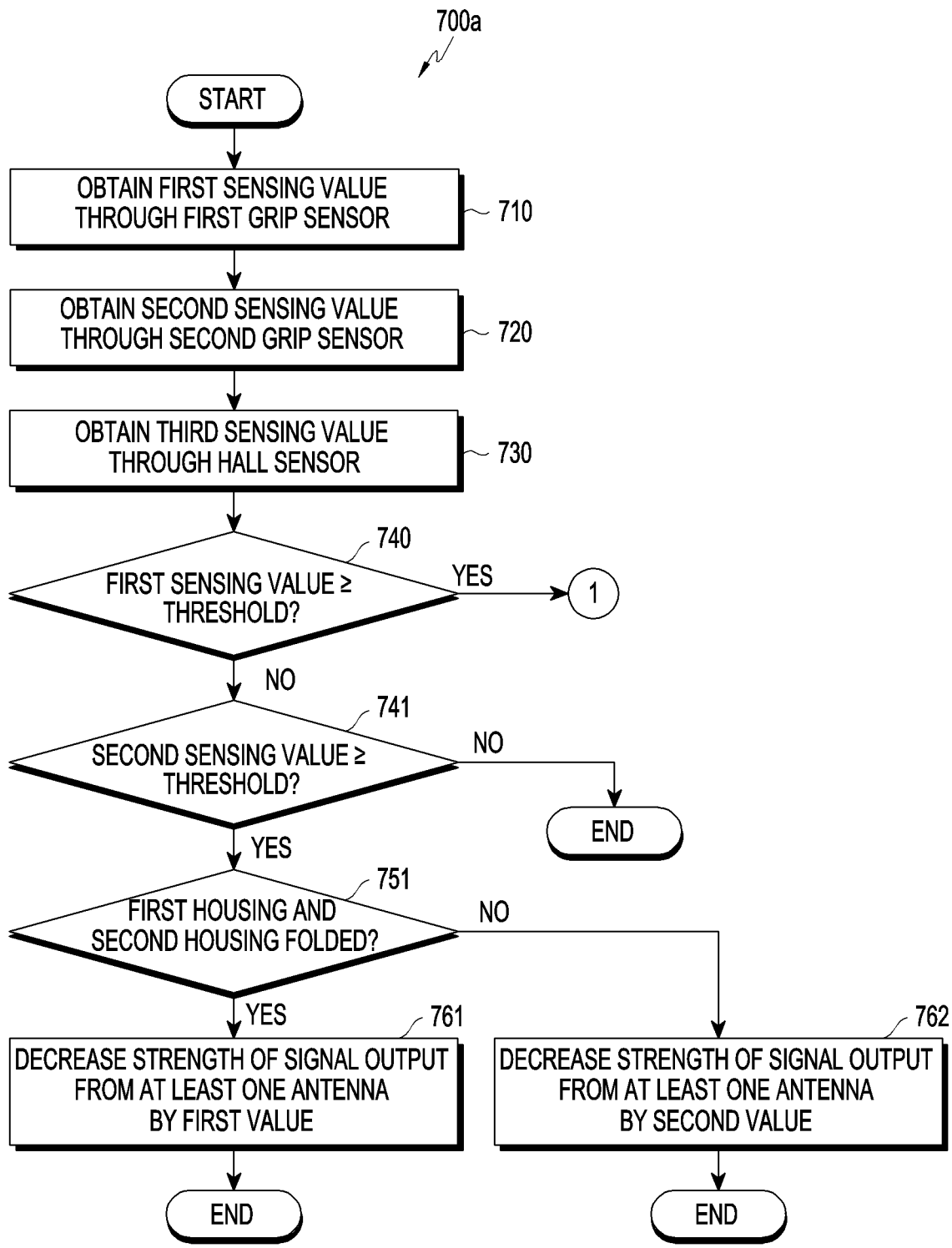
FIGS. 7A and 7B are flowcharts illustrating an operation of an electronic device according to various embodiments of the disclosure.
Figure 7B:
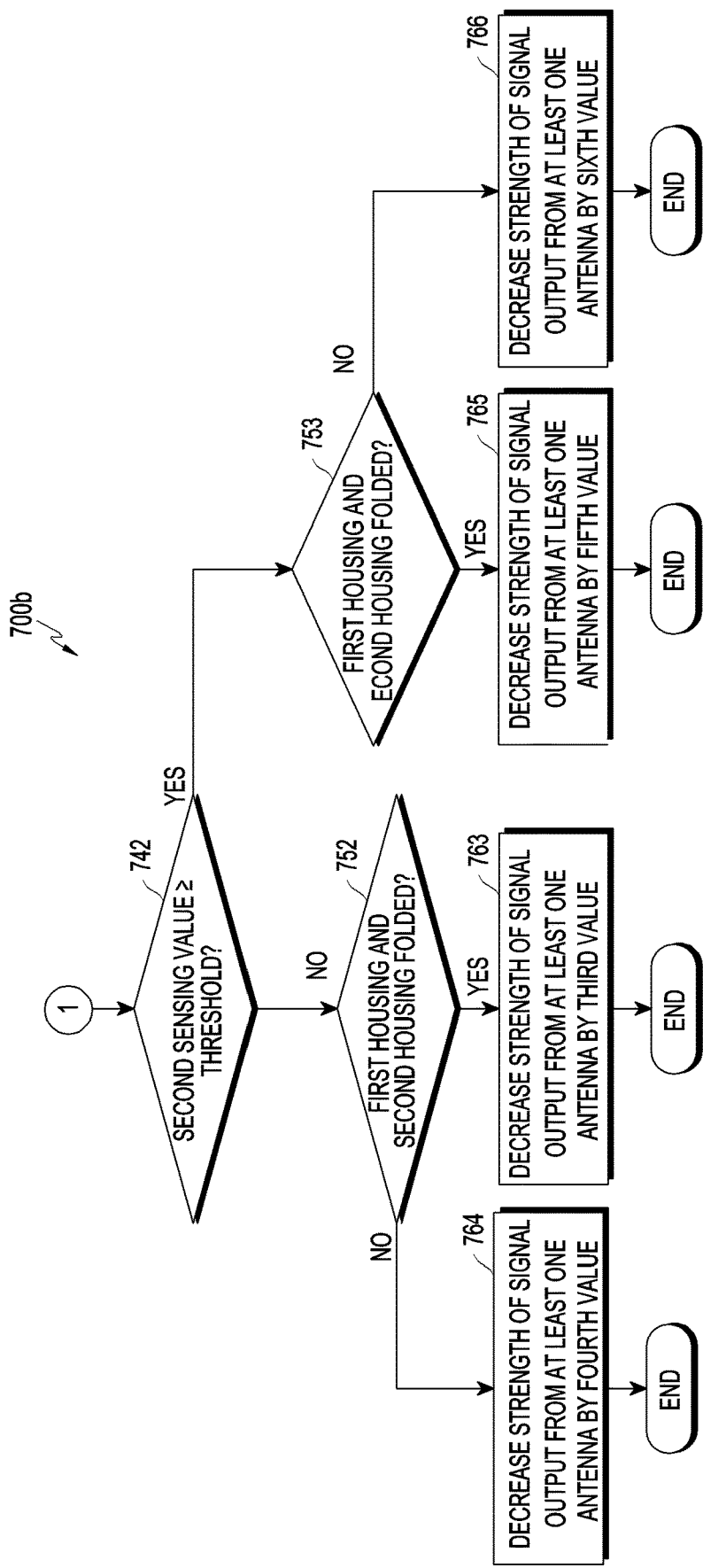

FIGS. 7A and 7B are flowcharts 700a and 700b illustrating an operation of an electronic device according to various embodiments of the disclosure.

Referring to FIG. 7A, in operation 710, a processor (e.g., the processor 120) of an electronic device (e.g., the electronic device 101) may obtain a first detection value through a first grip sensor. According to various embodiments of the disclosure, the first grip sensor may be the grip sensor described before with reference to FIGS. 4A and 4B.

In operation 720, the processor (e.g., the processor 120) of the electronic device (e.g., the electronic device 101) may obtain a second detection value through a second grip sensor. According to various embodiments of the disclosure, the electronic device 101 may include a first housing and a second housing rotatably coupled to the first housing. The first grip sensor may be disposed in the first housing, and the second grip sensor may be disposed in the second housing. According to various embodiments of the disclosure, the second grip sensor may be the grip sensor described before with reference to FIGS. 4A and 4B.

In operation 730, the processor (e.g., the processor 120) of the electronic device (e.g., the electronic device 101) may obtain a third detection value from a hall sensor. According to various embodiments of the disclosure, the detection value may indicate whether the first housing and the second housing are folded. According to various embodiments of the disclosure, the hall sensor may be disposed at a connector (e.g., the connector 240b) coupling the first housing and second housing to be rotatable.

In operation 740, the processor (e.g., the processor 120) of the electronic device (e.g., the electronic device 101) may identify whether the first detection value is equal to or greater than a threshold. When the processor 120 identifies that the first detection value is less than the threshold in operation 740, the processor 120 may identify whether the second detection value is equal to or greater than the threshold in operation 741. When the processor 120 identifies that the second detection value is less than the threshold in operation 741, the processor 120 may end the method. In this case, the processor 120 of the electronic device 101 may not change the strength of a signal output from at least one antenna (e.g., the antenna module 197).

When the processor 120 identifies that the second detection value is equal to or greater than the threshold in operation 741, the processor 120 may identify whether the first housing and the second housing are folded based on the third detection value in operation 751. When the processor 120 identifies that the first housing and the second housing are folded in operation 751, the processor 120 may decrease the strength of the signal output from the at least one antenna (e.g., the antenna module 197) by a first value in operation 761. When the processor 120 identifies that the first housing and the second housing are not folded in operation 751, the processor 120 may decrease the strength of the signal output from the at least one antenna (e.g., the antenna module 197) by a second value in operation 762.

Referring to FIG. 7B, when the processor 120 identifies that the first detection value is equal to or greater than the threshold in operation 740, the processor 120 may identify whether the second detection value is equal to or greater than the threshold in operation 742. When the processor 120 identifies that the second detection value is less than the threshold in operation 742, the processor 120 may identify whether the first housing and the second housing are folded based on the third detection value in operation 752. When the processor 120 identifies that the first housing and the second housing are folded in operation 752, the processor 120 may decrease the strength of the signal output from the at least one antenna (e.g., the antenna module 197) by a third value in operation 763. When the processor 120 identifies that the first housing and the second housing are not folded in operation 752, the processor 120 may decrease the strength of the signal output from the at least one antenna (e.g., the antenna module 197) by a fourth value in operation 764.

When the processor 120 identifies that the second detection value is equal to or greater than the threshold in operation 742, the processor 120 may identify whether the first housing and the second housing are folded based on the third detection value in operation 753. When the processor 120 identifies that the first housing and the second housing are folded in operation 753, the processor 120 may decrease the strength of the signal output from the at least one antenna (e.g., the antenna module 197) by a fifth value in operation 765. When the processor 120 identifies that the first housing and the second housing are not folded in operation 753, the processor 120 may decrease the strength of the signal output from the at least one antenna (e.g., the antenna module 197) by a sixth value in operation 766.

According to various embodiments of the disclosure, the first to sixth values may be empirically determined to be values satisfying a required SAR reference value. According to various embodiments of the disclosure, the electronic device (e.g., the electronic device 101) may be brought into contact with a flat phantom, and then a SAR value may be measured within the flat phantom. In this case, in the state where the second housing folded to the first housing in the electronic device 101 is in contact with the flat phantom, the first value may be determined to be a value that makes a detected SAR value equal to or less than the reference value. In the state where the second housing unfolded from the first housing in the electronic device 101 is in contact with the flat phantom, the second value may be determined to be a value that makes a detected SAR value equal to or less than the reference value. In the state where the first housing folded to the second housing in the electronic device 101 is in contact with the flat phantom, the third value may be determined to be a value that makes a detected SAR value equal to or less than the reference value. In the state where the first housing unfolded from the second housing in the electronic device 101 is in contact with the flat phantom, the fourth value may be determined to be a value that makes a detected SAR value equal to or less than the reference value. In the state where bottom ends of the first and second housing which are folded to each other in the electronic device 101 are in contact with the flat phantom, the fifth value may be determined to be a value that makes a detected SAR value equal to or less than the reference value. In the state where the bottom ends of the first and second housing which are unfolded from each other in the electronic device 101 are in contact with the flat phantom, that is, in the state where a side surface including the antenna 215*a* in one of the first and second housings and a corresponding side surface of the other housing without the antenna 215*a* are in contact with the flat phantom, the sixth value may be determined to be a value that makes a detected SAR value equal to or less than the reference value.

According to various embodiments of the disclosure, a SAR value may be measured inside a specific anthropomorphic mannequin (SAM) being an anatomical head model, which is positioned near to an electronic device (e.g., the electronic device 101). The above-described conditions may be applied in a similar manner to the flat phantom, to determine the first to sixth values, respectively. Therefore, the conditions will not be described again herein.

According to various embodiments of the disclosure, when the first detection value is less than the predetermined threshold and the second detection value is equal to or greater than the predetermined threshold, it may be understood that the user has touched the second housing, not the first housing. Similarly, when the first detection value is equal to or greater than the predetermined threshold and the second detection value is less than the predetermined threshold, it may be understood that the user has touched the first housing, not the second housing. Therefore, according to various embodiments of the disclosure, when at least one antenna is disposed in the first housing, with no antenna in the second housing, the third value may be set to be greater than the first value, and the fourth value may be set to be greater than the second value. Alternatively, when at least one antenna is disposed in the second housing, with no antenna in the first housing, the third value may be set to be less than the first value, and the fourth value may be set to be less than the second value.

According to various embodiments of the disclosure, when both of the first detection value and the second detection value are equal to or greater than the predetermined threshold, it may be understood that the user has touched both of the first and second housings. Therefore, the fifth value may be set to be greater than the first and third values, and the sixth value may be set to be greater than the second and fourth values.

According to various embodiments of the disclosure, when the first housing and the second housing are folded to each other, the processor 120 may be configured to decrease the strength of a signal output from the antenna by less than when the first housing and the second housing are not folded to each other, in order to reduce the degradation of antenna performance. For example, the second value may be set to be greater than the first value, the fourth value may be set to be greater than the third value, and the sixth value may be set to be greater than the fifth value.

According to various embodiments of the disclosure, the first to sixth values may vary according to a frequency band. According to various embodiments of the disclosure, a description of relative magnitudes of at least two of the first value, the second value, the third value, the fourth value, the fifth value, or the sixth value may be understood as a description of relative magnitudes of at least two of the first value, the second value, the third value, the fourth value, the fifth value, or the sixth value in the same frequency band.

Figure 8:
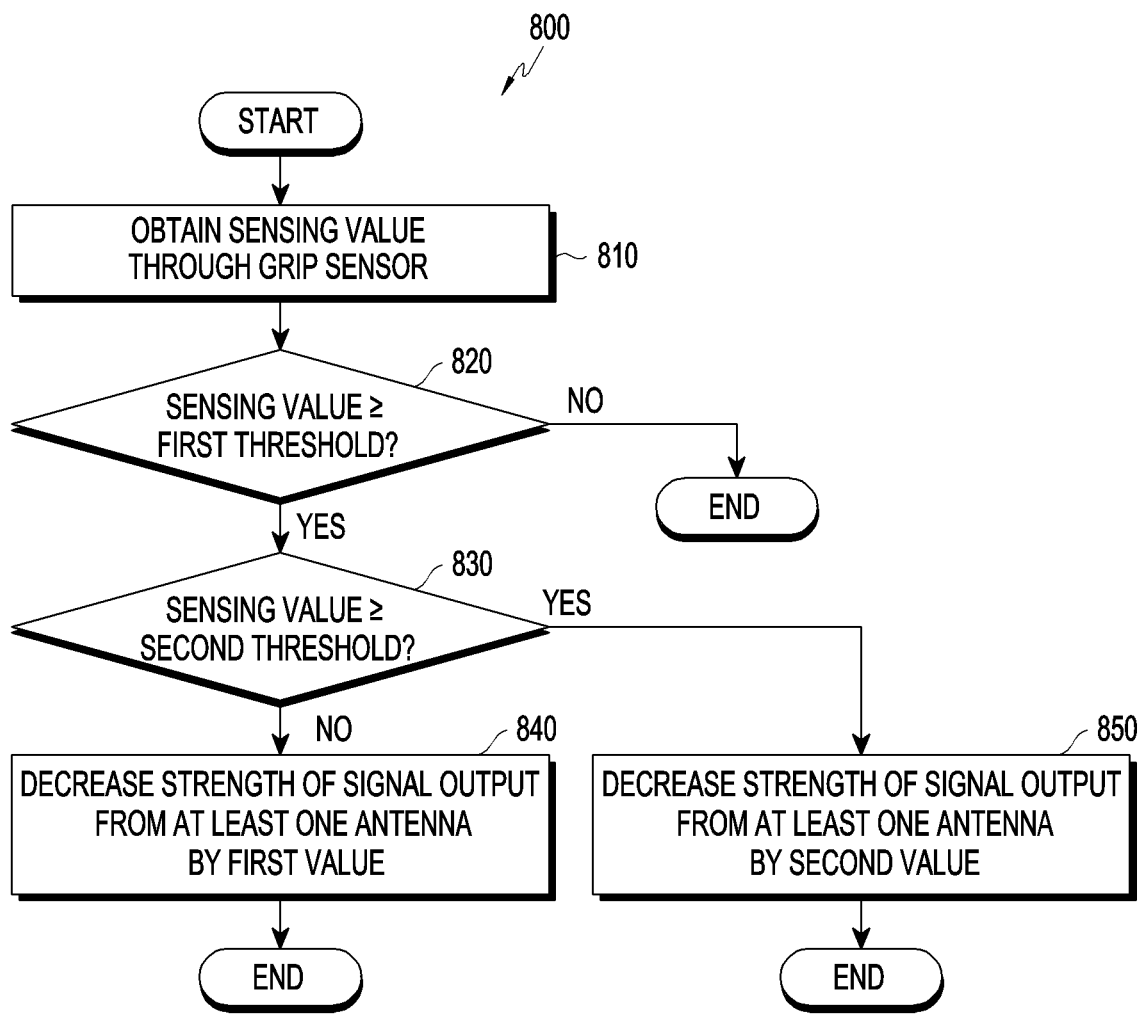
FIG. 8 is a flowchart illustrating an operation of an electronic device according to an embodiment of the disclosure.

FIG. 8 is a flowchart 800 illustrating an operation of an electronic device according to an embodiment of the disclosure.

Referring to FIG. 8, in operation 810, a processor (e.g., the processor 120) of an electronic device (e.g., the electronic device 101) may obtain a detection value from a grip sensor. According to various embodiments of the disclosure, the grip sensor may be the grip sensor described before with reference to FIGS. 4A and 4B. According to various embodiments of the disclosure, the electronic device 101 may include a first housing, a second housing rotatably coupled to the first housing, and a connector (e.g., the connector 240b) coupling the first and second housings to be rotatable. The grip sensor may be disposed at the connector 240b.

In operation 820, the processor (e.g., the processor 120) of the electronic device (e.g., the electronic device 101) may identify whether the detection value is equal to or greater than a first threshold. When the processor 120 identifies that the detection value is less than the first threshold in operation 820, the processor 120 may end the method. When the detection value is less than the first threshold, it may be understood that the UE is not touching the electronic device 101. In this case, the processor 120 of the electronic device 101 does not change the strength of a signal output from at least one antenna (e.g., the antenna module 197).

When the processor 120 identifies that the detection value is equal to or greater than the first threshold in operation 820, the processor 120 may identify whether the detection value is equal to or greater than a second threshold in operation 830. When the processor 120 identifies that the detection value is less than the second threshold in operation 830, the processor 120 of the electronic device 101 may decrease the strength of the signal output from the at least one antenna (e.g., the antenna module 197) by a first value in operation 840. When the processor 120 identifies that the detection value is equal to or greater than the second threshold in operation 830, the processor 120 of the electronic device 101 may decrease the strength of the signal output from the at least one antenna (e.g., the antenna module 197) by a second value in operation 850.

According to various embodiments of the disclosure, when the processor 120 identifies that the detection value is equal to or greater than the first threshold and less than the second threshold, it may be understood that the user is touching the front or rear surface of the electronic device 101. According to various embodiments of the disclosure, when the processor 120 identifies that the detection value is equal to or greater than the second threshold, it may be understood that the user is touching a bottom end of the electronic device 101. According to various embodiments of the disclosure, the bottom end of the electronic device (e.g., the electronic device 200b) may be defined to include a side surface including the antenna 215a in one of the first and second housings and a corresponding side surface of the other housing without the antenna 215a. According to various embodiments of the disclosure, the second value may be set to be greater than the first value.

According to various embodiments of the disclosure, the first value and the second value may vary according to a frequency band. According to various embodiments of the disclosure, a description of relative magnitudes of the first value and the second value may be understood as a description of relative magnitudes of the first value and the second value in the same frequency band.

According to various embodiments of the disclosure, a foldable electronic device may include a first housing 210a, a second housing 220a rotatably coupled to the first housing 210a, an antenna 197 disposed in at least one of the first housing 210a or the second housing 220a, a first grip sensor disposed in the first housing 210a, a second grip sensor disposed in the second housing 220a, and the processor 120. The processor 120 may be configured to obtain a first detection value through the first grip sensor, obtain a second detection value through the second grip sensor, and decrease the strength of a signal output from the antenna 197 based on the first detection value and the second detection value.

According to various embodiments of the disclosure, the at least one processor may be configured to decrease the strength of the signal output from the antenna 197 by a first value, when the first detection value is equal to or greater than a threshold and the second detection value is less than the threshold, to decrease the strength of the signal output from the antenna 197 by a second value, when the first detection value is less than the threshold and the second detection value is equal to or greater than the threshold, and to decrease the strength of the signal output from the antenna 197 by a third value, when the first detection value is equal to or greater than the threshold and the second detection value is equal to or greater than the threshold. The third value may be greater than the first value and the second value.

According to various embodiments of the disclosure, the antenna 197 may be disposed in the first housing 210a, and the first value may be greater than the second value.

According to various embodiments of the disclosure, the antenna 197 may be disposed in the second housing 220a, and the first value may be less than the second value.

According to various embodiments of the disclosure, the foldable electronic device may further include a hall sensor. The processor 120 may be configured to identify, through the hall sensor, whether the first housing 210a and the second housing 220a are folded to each other, to decrease the strength of the signal output from the antenna 197 by a first value, when the first detection value is less than a threshold, the second detection value is equal to or greater than the threshold, and the first housing 210a and the second housing 220a are folded to each other, to decrease the strength of the signal output from the antenna 197 by a second value, when the first detection value is less than the threshold, the second detection value is equal to or greater than the threshold, and the first housing 210a and the second housing 220a are not folded to each other, to decrease the strength of the signal output from the antenna 197 by a third value, when the first detection value is equal to or greater than the threshold, the second detection value is less than the threshold, and the first housing 210a and the second housing 220a are folded to each other, to decrease the strength of the signal output from the antenna 197 by a fourth value, when the first detection value is equal to or greater than the threshold, the second detection value is less than the threshold, and the first housing 210a and the second housing 220a are not folded to each other, to decrease the strength of the signal output from the at least one antenna by a fifth value, when the first detection value is equal to or greater than the threshold, the second detection value is equal to or greater than the threshold, and the first housing 210a and the second housing 220a are folded to each other, and to decrease the strength of the signal output from the at least one antenna by a sixth value, when the first detection value is equal to or greater than the threshold, the second detection value is equal to or greater than the threshold, and the first housing 210*a* and the second housing 220*a* are not folded to each other. The fifth value may be greater than the first value and the third value, the sixth value may be greater than the second value and the fourth value, the second value may be greater than the first value, the fourth value may be greater than the third value, and the sixth value may be greater than the fifth value.

According to various embodiments of the disclosure, the antenna 197 may be disposed in the first housing 210*a*, the third value may be greater than the first value, and the fourth value may be greater than the second value.

According to various embodiments of the disclosure, the antenna 197 may be disposed in the second housing 220*a*, the third value may be less than the first value, and the fourth value may be less than the second value.

According to various embodiments of the disclosure, the foldable electronic device may further include a third housing rotatably coupled to a side surface of the first housing 210*a* opposite to a side surface of the first housing 210*a*, coupled to the second housing 220*a*.

According to various embodiments of the disclosure, when the first housing 210*a*, the second housing 220*a*, and the third housing are folded, the third housing may be interposed between the first housing 210*a* and the second housing 220*a*.

According to various embodiments of the disclosure, when the first housing 210*a*, the second housing 220*a*, and the third housing are folded, the first housing 210*a* may be interposed between the second housing 220*a* and the third housing.

According to various embodiments of the disclosure, the first grip sensor may include a first conductor, the second grip sensor may include a second conductor, and each of the first conductor and the second conductor may be a part of an outer surface of the foldable electronic device.

According to various embodiments of the disclosure, a foldable electronic device may include a first housing 210*a*, a second housing 220*a* rotatably coupled to the first housing 210*a*, a connector rotatable between the first housing 210*a* and the second housing 220*a*, antenna 197 disposed in the first housing 210*a* or the second housing 220*a*, a grip sensor disposed at the connector, and a processor 120. The processor 120 may be configured to obtain a detection value from the grip sensor, and decrease the strength of a signal output from the antenna 197 based on the detection value.

According to various embodiments of the disclosure, the processor 120 may be configured to decrease the strength of the signal output from the at least one antenna 170 by a first value, when the detection value is equal to or greater than a first threshold and less than a second threshold greater than the first threshold, and to decrease the strength of the signal output from the at least one antenna 170 by a second value greater than the first value, when the detection value is equal to or greater than the second threshold.

According to various embodiments of the disclosure, a method performed in a foldable electronic device may include obtaining a first detection value through a first grip sensor disposed in a first housing 210*a* of the foldable electronic device, obtaining a second detection value through a second grip sensor disposed in a second housing 220*a* rotatably coupled to the first housing 210*a*, and decreasing the strength of a signal output from at least one antenna disposed in the first housing 210*a* or the second housing 220*a* based on the first detection value and the second detection value.

According to various embodiments of the disclosure, the decreasing of the strength of a signal output from the antenna 197 may include decreasing the strength of the signal output from the antenna 197 by a first value when the first detection value is equal to or greater than a threshold and the second detection value is less than the threshold, decreasing the strength of the signal output from the antenna 197 by a second value when the first detection value is less than the threshold and the second detection value is equal to or greater than the threshold, and decreasing the strength of the signal output from the antenna 197 by a third value when the first detection value is equal to or greater than the threshold and the second detection value is equal to or greater than the threshold. The third value may be greater than the first value and the second value.

According to various embodiments of the disclosure, the antenna 197 may be disposed in the first housing 210*a*, and the first value may be greater than the second value.

According to various embodiments of the disclosure, the antenna 197 may be disposed in the second housing 220*a*, and the first value may be less than the second value.

According to various embodiments of the disclosure, the method may further include identifying, through a hall sensor, whether the first housing 210*a* and the second housing 220*a* are folded to each other. The decreasing of the strength of a signal output from the at least one antenna 170 may include decreasing the strength of the signal output from the antenna 197 by a first value when the first detection value is less than a threshold, the second detection value is equal to or greater than the threshold, and the first housing 210*a* and the second housing 220*a* are folded to each other, decreasing the strength of the signal output from the antenna 197 by a second value when the first detection value is less than the threshold, the second detection value is equal to or greater than the threshold, and the first housing 210*a* and the second housing 220*a* are not folded to each other, decreasing the strength of the signal output from the antenna 197 by a third value when the first detection value is equal to or greater than the threshold, the second detection value is less than the threshold, and the first housing 210*a* and the second housing 220*a* are folded to each other, decreasing the strength of the signal output from the antenna 197 by a fourth value when the first detection value is equal to or greater than the threshold, the second detection value is less than the threshold, and the first housing 210*a* and the second housing 220*a* are not folded to each other, decreasing the strength of the signal output from the antenna 197 by a fifth value when the first detection value is equal to or greater than the threshold, the second detection value is equal to or greater than the threshold, and the first housing 210*a* and the second housing 220*a* are folded to each other, and decreasing the strength of the signal output from the antenna 197 by a sixth value when the first detection value is equal to or greater than the threshold, the second detection value is equal to or greater than the threshold, and the first housing 210*a* and the second housing 220*a* are not folded to each other. The fifth value may be greater than the first value and the third value, the sixth value may be greater than the second value and the fourth value, the second value may be greater than the first value, the fourth value may be greater than the third value, and the sixth value may be greater than the fifth value.

According to various embodiments of the disclosure, the antenna 197 may be disposed in the first housing 210*a*, the third value may be greater than the first value, and the fourth value may be greater than the second value.

According to various embodiments of the disclosure, the antenna 197 may be disposed in the second housing 220*a*, the third value may be less than the first value, and the fourth value may be less than the second value.

According to various embodiments of the disclosure, a method performed in a foldable electronic device including a first housing 210a and a second housing 220a rotatably coupled to the first housing 210a may include obtaining a detection value from a grip sensor disposed at a connector rotatable between the first housing 210a and the second housing 220a, and decreasing the strength of a signal output from at least one antenna 197 disposed in the first housing 210a or the second housing 220a based on the detection value.

According to various embodiments of the disclosure, the decreasing of the strength of a signal output from the antenna 197 may include decreasing the strength of the signal output from the antenna 197 by a first value when the detection value is equal to or greater than a first threshold and less than a second threshold greater than the first threshold, and decreasing the strength of the signal output from the at least one antenna by a second value greater than the first value when the detection value is equal to or greater than the second threshold.

As is apparent from the foregoing description, according to various embodiments of the disclosure, an electronic device with a grip sensor and a method of controlling the electronic device with a grip sensor are provided. Therefore, a foldable electronic device in which two housings are rotatably coupled to each other may include two grip sensors, each in one of the housings. Accordingly, the electronic device may detect a user's touch irrespective of which housing is touched by the user.

Further, according to various embodiments of the disclosure, the electronic device may identify a part of the electronic device touched by the user based on detection values from the two grip sensors. Therefore, the strength of a signal output from an antenna may be appropriately decreased by as much as required according to a part of the electronic device touched by the user. Accordingly, the electronic device may minimize reduction of the TRP of the antenna, while maintaining a SAR value to be equal to or less than a value specified in a standard, thereby increasing the communication performance of the antenna.

It should be appreciated that various embodiments and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A foldable electronic device comprising:
   a first housing;
   a second housing rotatably coupled to the first housing;
   at least one antenna disposed in at least one of the first housing or the second housing;
   a first grip sensor disposed in the first housing;
   a second grip sensor disposed in the second housing; and
   at least one processor configured to:
      obtain a first detection value through the first grip sensor,
      obtain a second detection value through the second grip sensor, and
      decrease a strength of a signal output from the at least one antenna based on the first detection value and the second detection value,
   wherein the at least one processor is further configured to:
      in response to the first detection value being equal to or greater than a threshold and the second detection value being less than the threshold, decrease the strength of the signal output from the at least one antenna by a first value,
      in response to the first detection value being less than the threshold and the second detection value being equal to or greater than the threshold, decrease the strength of the signal output from the at least one antenna by a second value,
      in response to the first detection value being equal to or greater than the threshold and the second detection value being equal to or greater than the threshold, decrease the strength of the signal output from the at least one antenna by a third value, and
   wherein the third value is greater than the first value and the second value.

2. The foldable electronic device of claim 1, wherein the at least one antenna is disposed in the first housing, and the first value is greater than the second value.

3. The foldable electronic device of claim 1, wherein the at least one antenna is disposed in the second housing, and the first value is less than the second value.

4. The foldable electronic device of claim 1, further comprising a third housing rotatably coupled to a side surface of the first housing opposite to a side surface of the first housing, coupled to the second housing.

5. The foldable electronic device of claim 4, wherein, in response to the first housing, the second housing, and the third housing being folded, the third housing is interposed between the first housing and the second housing.

6. The foldable electronic device of claim 4, wherein, in response to the first housing, the second housing, and the third housing being folded, the first housing is interposed between the second housing and the third housing.

7. The foldable electronic device of claim 1, wherein the first grip sensor includes a first conductor, the second grip sensor includes a second conductor, and each of the first conductor and the second conductor is a part of an outer surface of the foldable electronic device.

8. A method performed in a foldable electronic device, the method comprising:
   obtaining a first detection value through a first grip sensor disposed in a first housing of the foldable electronic device;
   obtaining a second detection value through a second grip sensor disposed in a second housing rotatably coupled to the first housing; and
   decreasing a strength of a signal output from at least one antenna disposed in the first housing or the second housing based on the first detection value and the second detection value,
   wherein the decreasing of a strength of a signal output from at least one antenna comprises:
      in response to the first detection value being equal to or greater than a threshold and the second detection value being less than the threshold, decreasing the strength of the signal output from the at least one antenna by a first value;
      in response to the first detection value being less than the threshold and the second detection value being equal to or greater than the threshold, decreasing the strength of the signal output from the at least one antenna by a second value; and
      in response to the first detection value being equal to or greater than the threshold and the second detection value being equal to or greater than the threshold, decreasing the strength of the signal output from the at least one antenna by a third value, and
   wherein the third value is greater than the first value and the second value.

9. The method of claim 8, wherein the at least one antenna is disposed in the first housing, and the first value is greater than the second value.

10. The method of claim 8, wherein the at least one antenna is disposed in the second housing, and the first value is less than the second value.

11. A foldable electronic device comprising:
    a first housing;
    a second housing rotatably coupled to the first housing;
    a connector rotatable between the first housing and the second housing;
    at least one antenna disposed in the first housing or the second housing;
    a grip sensor disposed at the connector; and
    at least one processor configured to:
       obtain a detection value through the grip sensor, and
       decrease a strength of a signal output from the at least one antenna based on the detection value,
    wherein the at least one processor is further configured to:
       in response to the detection value being equal to or greater than a first threshold and less than a second threshold greater than the first threshold, decrease the strength of the signal output from the at least one antenna by a first value, and
       in response to the detection value being equal to or greater than the second threshold, decrease the strength of the signal output from the at least one antenna by a second value greater than the first value.

\* \* \* \* \*